C. R. JAHN.
DENITRATION OF WASTE ACID.
APPLICATION FILED OCT. 11, 1913.
1,149,585.
Patented Aug. 10, 1915.
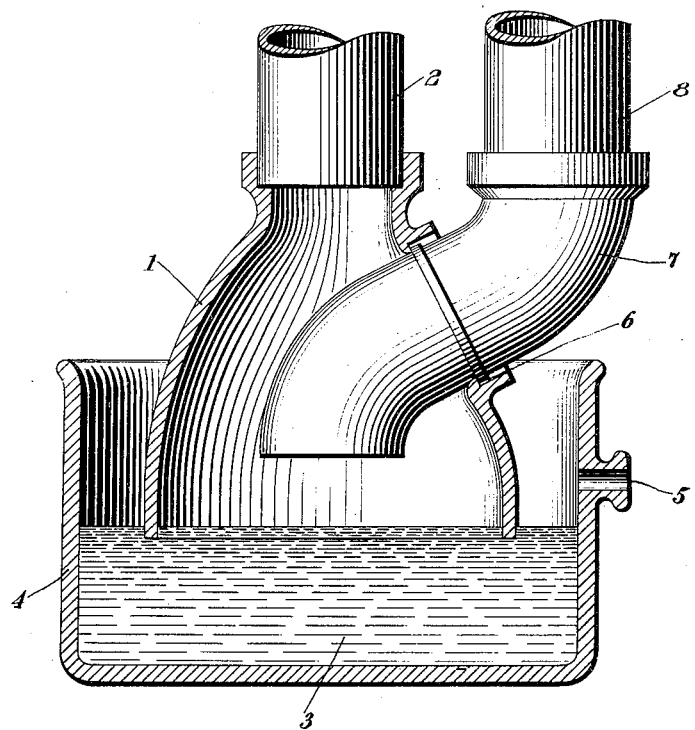

UNITED STATES PATENT OFFICE.

CARL RUDOLF JAHN, OF SCHLEBUSCH, GERMANY, ASSIGNOR TO SPRENGSTOFF ACTIEN GESELLSCHAFT CARBONIT, OF HAMBURG, GERMANY.

DENITRATION OF WASTE ACID.

1,149,585.  Specification of Letters Patent.  Patented Aug. 10, 1915.

Application filed October 11, 1913. Serial No. 794,571.

*To all whom it may concern:*

Be it known that I, CARL RUDOLF JAHN, of Schlebusch, in the Rhine Province, and in the Kingdom of Prussia, Germany, have invented a certain new and useful Improvement in Denitration of Waste Acids, and do hereby declare that the following is a full, clear, and exact description thereof.

My invention relates particularly to the denitration of waste acids containing organic substances in solution. It has special reference to the treatment of such acids obtained in the nitration of aromatic nitro bodies such for example, as trinitrotoluene.

Hitherto great difficulty has arisen in the condensing plant used for condensing the nitric acid owing to the fact that the condensing plant has become choked by the organic bodies carried along with the nitric acid. The organic bodies in question are liquid when hot and settle in the condensation towers and elbows and thereafter become solid. The accumulations of this kind in the apparatus result in the necessity of interrupting the denitration from time to time in order to remove the obstructions. The removal of the obstructions furthermore, requires considerable time, especially owing to the fact that it is first necessary to locate the same, which may occur at any point in the condensing plant.

The object of my invention is to overcome these difficulties.

My invention is capable of being carried out in many different ways, but for the purpose of illustration I have shown one form of apparatus which may be used for carrying out my invention in the accompanying drawings, in which the figure indicates a vertical section of one form of apparatus which may be used in accordance with my invention.

In the drawings I have shown a bell 1 increasing in diameter toward its lower end, having an opening at its top for connection with a pipe 2 leading from the still (not shown). The bell 1 is so arranged that its lower end extends into a body of water or other liquid 3 within a receptacle 4. The receptacle 4 has an overflow outlet 5 on one side thereof. At one side of the bell 1 there is provided an outlet opening 6, which is arranged to receive an outlet pipe 7 to carry off the nitric acid gas. The lower end of the pipe 7 terminates some distance above the level of the body of water 3, and the other end of said pipe is arranged to be connected to a pipe 8 to convey the nitric acid gases to the condenser.

In the operation of my invention a body of waste acids is distilled and the gases coming from the still used for the denitration of the waste acids are passed through an ordinary trap, such as an earthenware pot, and is from this point conducted through the pipe 3, the bell 1, the pipe 7 and finally out through the pipe 8. The organic substances, which are carried along by the nitric acid gases, when coming into contact with the surface of the water in the receptacle 4, are solidified, while the gases pass on through the apparatus and out through the pipe 8. The solidified organic substances settle upon the bottom and along the walls of the receptacle, and owing to the fact that all of these parts are open and may be readily detached, the solid materials may be readily removed and recovered. The body of water 3, absorbs furthermore a quantity of the nitric acid and the nitric acid contained in the receptacle 4 will pass out of the overflow outlet 5 with a strength of substantially 36° Bé. The nitric acid gases which pass out of the apparatus through the pipe 8 may be passed through one or more additional separating devices, such as that shown in the drawings and may be finally condensed in a condensing apparatus such for example as a coke tower. By means of this process, the waste acids may be continuously denitrated without any interruption, a result which has not been obtained by former processes.

While I have described my invention above in detail, I wish it to be understood that many changes may be made therein without departing from the spirit of my invention.

I claim:

1. The process of denitration of materials containing organic substances in solution which comprises distilling the same, depositing said organic substances after evaporation but before the condensation of the main body of nitric acid and removing the deposited organic substances during the distillation.

2. The process of denitration of materials containing organic substances in solution which comprises distilling the same and depositing said organic substances after evaporation but before the condensation of the main body of nitric acid, by bringing the evaporated substances into contact with a body of water.

3. The process of denitration of materials containing organic substances in solution which comprises distilling the same and depositing said organic substances after evaporation but before the condensation of the main body of nitric acid, by leading the evaporated substances over the surface of a body of water.

4. The process of denitration of materials containing organic substances in solution which comprises distilling the same and depositing said organic substances after evaporation but before the condensation of the main body of nitric acid, by bringing the evaporated substances into contact with a body of water thus absorbing part of the nitric acid in the body of water and then conveying off and recovering the nitric acid not absorbed in this manner.

5. The process of denitration of materials containing organic substances in solution which comprises distilling the same and depositing said organic substances after evaporation but before the condensation of the main body of nitric acid, by leading the evaporated substances over the surface of a body of water, thus absorbing part of the nitric acid in the body of water and then conveying off and recovering the nitric acid not absorbed in this manner.

In testimony that I claim the foregoing I have hereunto set my hand.

CARL RUDOLF JAHN.

Witnesses:
 PETER BREUER,
 ANDREAS SCHMITZ.

Copies of this patent may be obtained for five cents each, by addressing the "Commissioner of Patents, Washington, D. C."